United States Patent Office 2,788,990
Patented Apr. 16, 1957

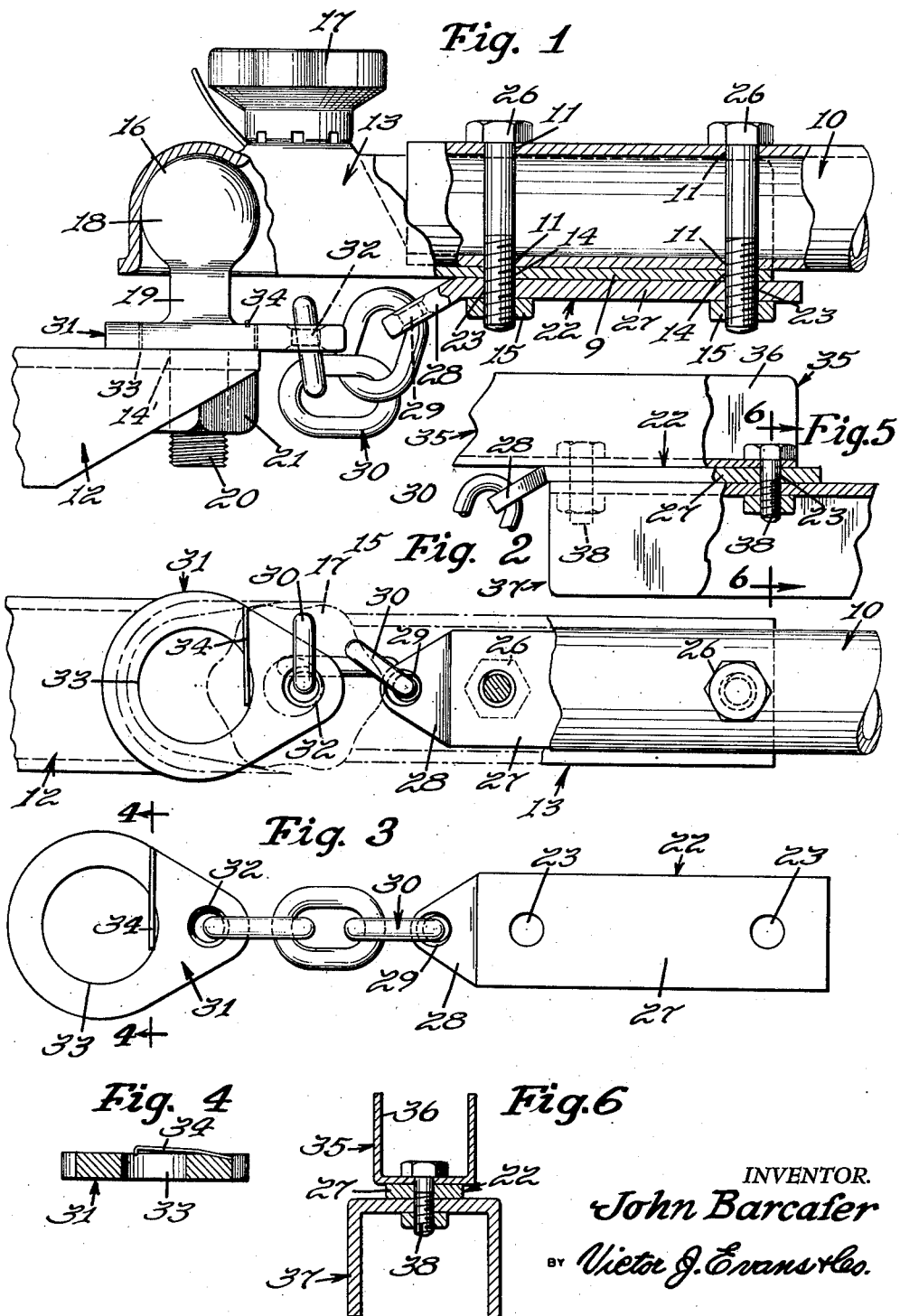
April 16, 1957   J. BARCAFER   2,788,990
BALL AND SOCKET HITCH WITH SAFETY CHAIN
Filed Dec. 21, 1954
INVENTOR.
John Barcafer
BY Victor J. Evans & Co.
ATTORNEYS

2,788,990

BALL AND SOCKET HITCH WITH SAFETY CHAIN

John Barcafer, Shattuck, Okla.

Application December 21, 1954, Serial No. 476,799

3 Claims. (Cl. 280—457)

This invention relates to a trailer hitch, and more particularly to a safety chain for a trailer hitch.

The object of the invention is to provide a safety chain which will insure that the trailer will remain connected to the rear of a towing vehicle even if the hitch breaks.

Another object of the invention is to provide a safety chain for use with a trailer hitch wherein the safety chain will insure that the vehicle being towed such as a trailer will remain in proper position behind the towing vehicle such as an automobile or truck, even though the regular hitch might become broken or inoperative so that accidents or injury to persons on the road will be prevented.

A further object of the invention is to provide a safety chain which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the hitch assembly of the present invention, with parts broken away and in section.

Figure 2 is a bottom plan view of the hitch assembly, with parts broken away and in section.

Figure 3 is a plan view of the safety chain per se.

Figure 4 is a sectional view taken on the line 4—4 of Figure 3.

Figure 5 is a fragmentary side elevational view of a modification showing a different type of tongue.

Figure 6 is a sectional view taken on the line 6—6 of Figure 5.

Referring in detail to the drawings, the numeral 10 designates a cylindrical pipe tongue which is adapted to be connected to a trailer being towed, and the pipe tongue 10 is provided with a plurality of spaced apart apertures 11. The numeral 12 designates a drawbar which extends rearwardly from a towing vehicle such as an automobile or truck, and there is provided a head 13 which includes a bottom portion 9 that has openings 14 therein. The head 13 is provided with a socket 16 in its front end for receiving therein a ball 18. A locking mechanism 17 is provided for maintaining the head 13 and ball 18 connected together.

The ball 18 is mounted on or formed integral with the upper end of a shank 19, and the lower end of the shank 19 is threaded as at 20. The shank 19 extends through the opening 14' in the drawbar 12, and a suitable securing element such as the nut 21 is arranged in threaded engagement with the portion 20 of the shank 19 for maintaining the shank 19 connected to the drawbar.

The safety chain assembly of the present invention includes a flat plate which is indicated generally by the numeral 22 and the plate 22 includes a main portion 27 and an angularly arranged front portion 28 which defines a lip, Figure 3. The main portion 27 of the plate 22 is provided with a plurality of spaced apart apertures 23, and the apertures 23 register with the apertures 11 in the tongue 10. These registering apertures also register with apertures 14 in the bottom 9 of the head 13. Suitable securing elements such as bolts 26 extend through the registering apertures 11, 14, and 23 for maintaining the parts in their proper assembled position. The angularly arranged lip 28 on the front of the plate 22 extends downwardly with respect to the main portion 27. Nuts 15 are arranged in threaded engagement with the lower ends of the bolts 26 for maintaining the parts in their proper assembled position.

A chain 30 has one link thereof arranged in engagement with an opening 29 in the ear or lip 28, and the rear link of the chain 30 is arranged in engagement with an opening 32 in a bracket 31. The bracket 31 is provided with an enlarged circular opening 33 through which extends the shank 19, and a spring member 34 has one end secured to the bracket 31. The spring member 34 projects over a portion of the opening 33 for maintaining the bracket 31 in its proper position on the shank.

From the foregoing it is apparent that there has been provided a safety chain for use with a trailer hitch. In use the main portion 27 of the plate 22 is arranged adjacent the lower surface of the bottom 9 of the head 13, and the tongue 10 as shown in Figure 1. Then, the bolt and nut assemblies 26 are used to connect the parts together and the bracket 13 is arranged so that the shank 29 projects through the opening 33. The locking assembly 17 maintains the head 13 in a position so that the socket 16 snugly receives therein the ball 18. Then, when the towing vehicle moves forward the head 13 will cause the trailer to be pulled or towed therebehind. In the event that the head 13 or socket 16 breaks, then the chain 30 will still maintain the towing vehicle and trailer connected together. The spring member 34 is normally in the position shown in the drawings so that it helps to retain the bracket 31 in its proper position on the shank 19, but by manually lifting the spring member 34 the bracket can be removed from the ball and shank.

The safety chain of the present invention is ruggedly constructed and can be made cheaply and easily. The size of the parts can vary as desired. With the present invention in the event that the head 13 breaks, then the trailer will still be kept in its proper position and will not whip around the road since the chain 30 will come into use. Furthermore, the safety chain can be quickly attached to or detached from the hitch.

Referring to Figures 5 and 6 of the drawings there is shown a modified safety chain wherein instead of using the cylindrical pipe tongue 10, there is used a U-shaped tongue 37 which can be secured to a vehicle in any suitable manner. The plate 22 is arranged adjacent the top of the tongue 37, and a head 35 having a U-shaped portion 36 is arranged above the plate 22. Suitable securing elements such as bolt and nut assemblies 38 are provided for interconnecting the head 35, plate 22 and tongue 37 together. The head 35 may have a ball arranged in engagement therewith, and the ball may be connected to a shank which extends upwardly from a drawbar such as the drawbar 12. The plate 22 has the same construction and purpose as the previously described plate. Thus, it will be seen that the plate 22 can be used with various types of hitches as for example the cylindrical tongue 10 of Figures 1–4, or else it can be used with the U-shaped head 35 and U-shaped tongue 37 of Figures 5 and 6. If desired, the tongue 10 can be welded to the head 13.

I claim:

1. A safety chain comprising a plate provided with a plurality of spaced apart apertures, an end portion of said plate being arranged angularly to define an ear, a chain having a link connected to said ear, and a bracket connected to said chain and provided with a circular opening therein, and a spring member having one end secured to said bracket and extending across a portion of the opening therein.

2. In combination, a tongue adapted to be attached to a vehicle being towed and provided with a plurality of spaced apart apertures therein, a drawbar extending rearwardly from a towing vehicle and provided with an opening therein, a shank extending through the opening in said drawbar and including a lower threaded portion, a securing element arranged in threaded engagement with the threaded portion of said shank for maintaining the shank connected to the drawbar, a ball on the upper end of said shank, a head provided with a socket in its rear end for receiving said ball, a plate including a main flat portion arranged contiguous to said head, there being registering apertures in the bottom portion of said head and in the main portion of said plate registering with the apertures in said tongue, securing elements extending through said registering apertures, the front of said plate being arranged angularly with respect to the main portion of said plate to define a downwardly extending ear having an aperture therein, a chain having a link arranged in engagement with the aperture in said ear, a bracket connected to another link of said chain and said bracket being provided with a circular opening for the projection therethrough of said shank, and a spring member having one end secured to said bracket and extending across a portion of the opening therein for maintaining the bracket in its proper position on the shank, said spring member adapted to be manually lifted whereby the bracket can be removed from the ball and shank.

3. A safety chain comprising a plate provided with a plurality of spaced apart apertures, a chain having a link connected to a portion of said plate, and a bracket connected to said chain and provided with an opening therein, and a yieldable member having one end secured to said bracket and extending across a portion of the opening therein.

References Cited in the file of this patent

UNITED STATES PATENTS

| | | |
|---|---|---|
| 1,636,295 | Dempsey | July 19, 1927 |
| 2,189,170 | Gaussoin | Feb. 6, 1940 |
| 2,474,078 | Wilcox | June 21, 1949 |
| 2,614,861 | Van Horn | Oct. 21, 1952 |
| 2,650,101 | Frankfother | Aug. 25, 1953 |

FOREIGN PATENTS

| | | |
|---|---|---|
| 8,985/32 | Australia | Sept. 7, 1933 |